No. 663,152. Patented Dec. 4, 1900.
F. BARDEN.
FARM GATE.
(Application filed July 8, 1899.)
(No Model.)
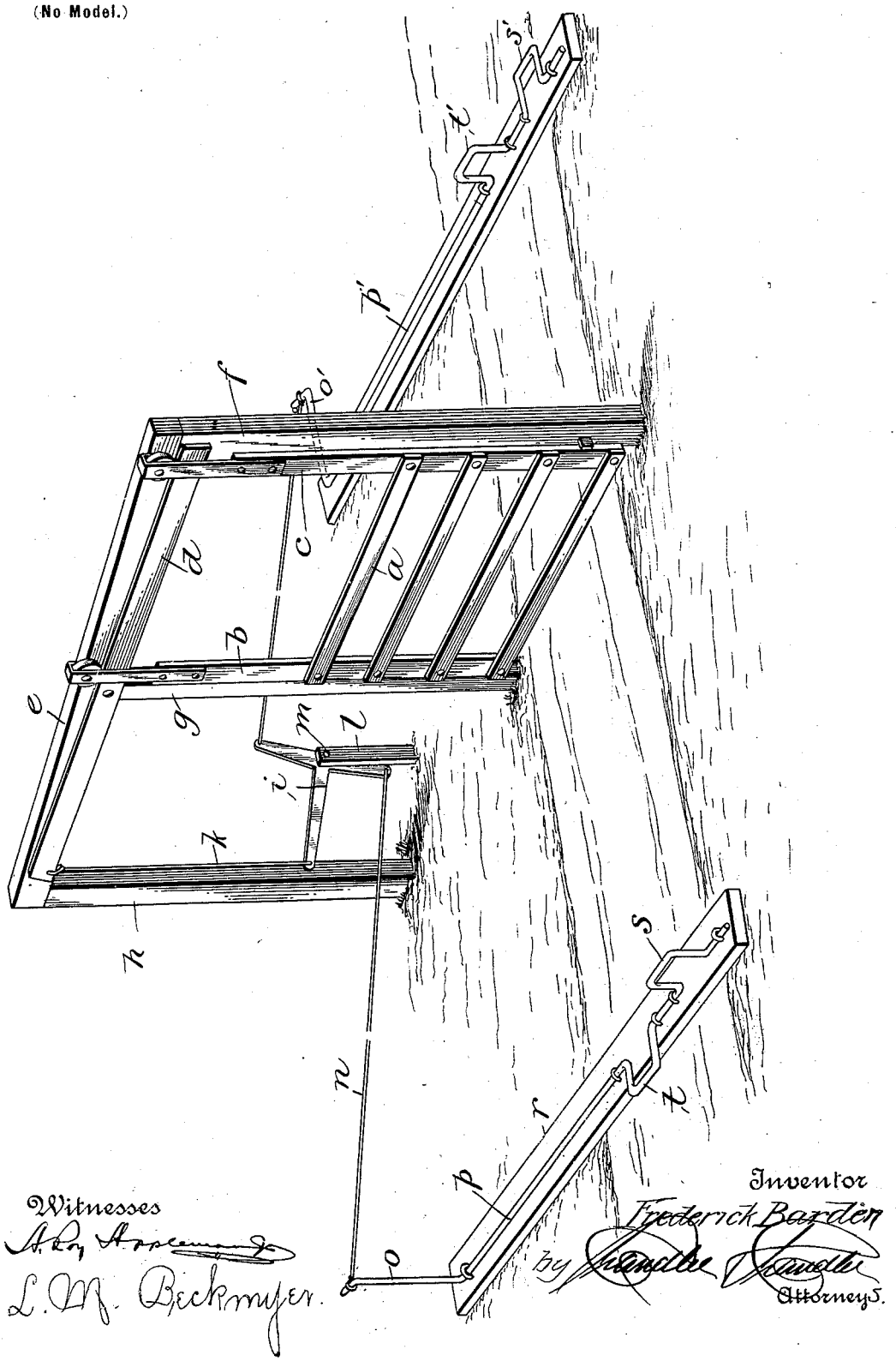
Witnesses
Inventor
Frederick Barden
by
Attorneys.

UNITED STATES PATENT OFFICE.

FREDERICK BARDEN, OF EAGLE GROVE, IOWA.

FARM-GATE.

SPECIFICATION forming part of Letters Patent No. 663,152, dated December 4, 1900.

Application filed July 8, 1899. Serial No. 723,203. (No model.)

*To all whom it may concern:*

Be it known that I, FREDERICK BARDEN, a citizen of the United States, residing at Eagle Grove, in the county of Wright, State of Iowa, have invented certain new and useful Improvements in Farm-Gates; and I do hereby declare the following to be a full, clear, and exact description of the invention, such as will enable others skilled in the art to which it appertains to make and use the same.

This invention relates to farm-gates; and its object is to provide a simple and efficient mechanism for opening and closing the gate by the action of a vehicle.

In the drawing I have shown a perspective view of a gate and its operating mechanism constructed and arranged in accordance with this invention.

Referring now to the drawing, $a$ represents a gate the end posts $b$ and $c$ of which are continued upwardly and have rollers adapted to travel upon a tilting track $d$, pivoted to a cross-beam $e$ upon uprights $f$, $g$, and $h$, arranged in alinement and transversely of the road. If preferred, the track may be pivoted directly to the middle post. Thus when the track $d$ is tilted the gate will run from one end to the other thereof and will open and close the gate-opening between the uprights $f$ and $g$.

In order to rock or tilt the track $d$, I connect one end thereof adjacent the upright $h$ with the stem of a T-lever $i$ through the medium of a rigid connection $k$. This lever $i$ is pivoted to a post $l$, set in the ground adjacent to the upright $h$, by means of a pivot-bolt $m$, passed through a perforation in the head of the lever midway of its ends.

One end of the head of the lever $i$ has pivotal connection with a reciprocatory rod $n$, which leads to the outer end of a crank $o$, secured to or formed integral with a rock-shaft $p$, journaled transversely of the approach to the gate and mounted upon a suitable base $r$, as shown. This shaft has two U-shaped cranks $s$ and $t$ near one end, which extend at right angles to each other, the crank $s$ when the gate is closed standing in an upright position and the crank $t$ lying upon the ground and in a position to rise to a vertical position as the crank $s$ is moved in the direction of the gate. Thus when a vehicle approaches and with its wheel strikes the crank $s$ the shaft $p$ will be rotated slightly, and the connecting-rod will correspondingly move the lever $i$, which through the medium of the rod $k$ will tilt the track $d$ to the opposite position from that shown in the drawing and cause the gate to slide open. The crank $t$ will then be in an upright position and upon being struck by a wheel going in the opposite direction will operate the crank-shaft to tilt the track into the position shown, when the gate will run shut.

On the opposite side of the gate from shaft $p$ is a similar shaft $p'$, having a crank $o'$, which is rigidly connected with the other end of the head of the lever $i$. The shaft $p'$ has U-shaped cranks $s'$ and $t'$ thereon, which extend in directions at right angles to their respective cranks $s$ and $t$, the movement of the crank $t'$ in the direction of the gate serving to tilt the track to open the gate, while the tilting of the crank $s'$ in the opposite direction acts to tilt the track $d$ to close the gate.

It will be of course understood that in practice I may employ any specific style of gate, that I may vary the proportions of the apparatus as desired, and that I may employ any suitable material or materials in the manufacture thereof without departing from the spirit of my invention.

Having thus described my invention, what I claim is—

A gate comprising a frame including end uprights and an intermediate upright, a cross-beam secured to the tops of the uprights, a track pivoted to the intermediate upright below the cross-beam, a gate having hangers slidably engaged with the track, a stop upon one of the end uprights to limit the movement of the gate in one direction, a post adjacent the opposite end upright, a T-lever having its head pivoted to the post and lying with its stem extending in front of the adjacent upright, a rock-shaft at each side of the frame having cranks, connecting-rods connecting the cranks with the head of the T- lever, one of said rods passing between the uprights for engagement by the gate to limit its movement in that direction, and a connection between the stem of the T-lever and a pivoted rail, whereby when the crank-shafts are operated, the gate will be given limited sliding movement.

In testimony whereof I affix my signature in presence of two witnesses.

FRED. BARDEN.

Witnesses:
W. G. BEACH,
LEM. F. LINCOLN.